3,025,123
Patented Mar. 13, 1962

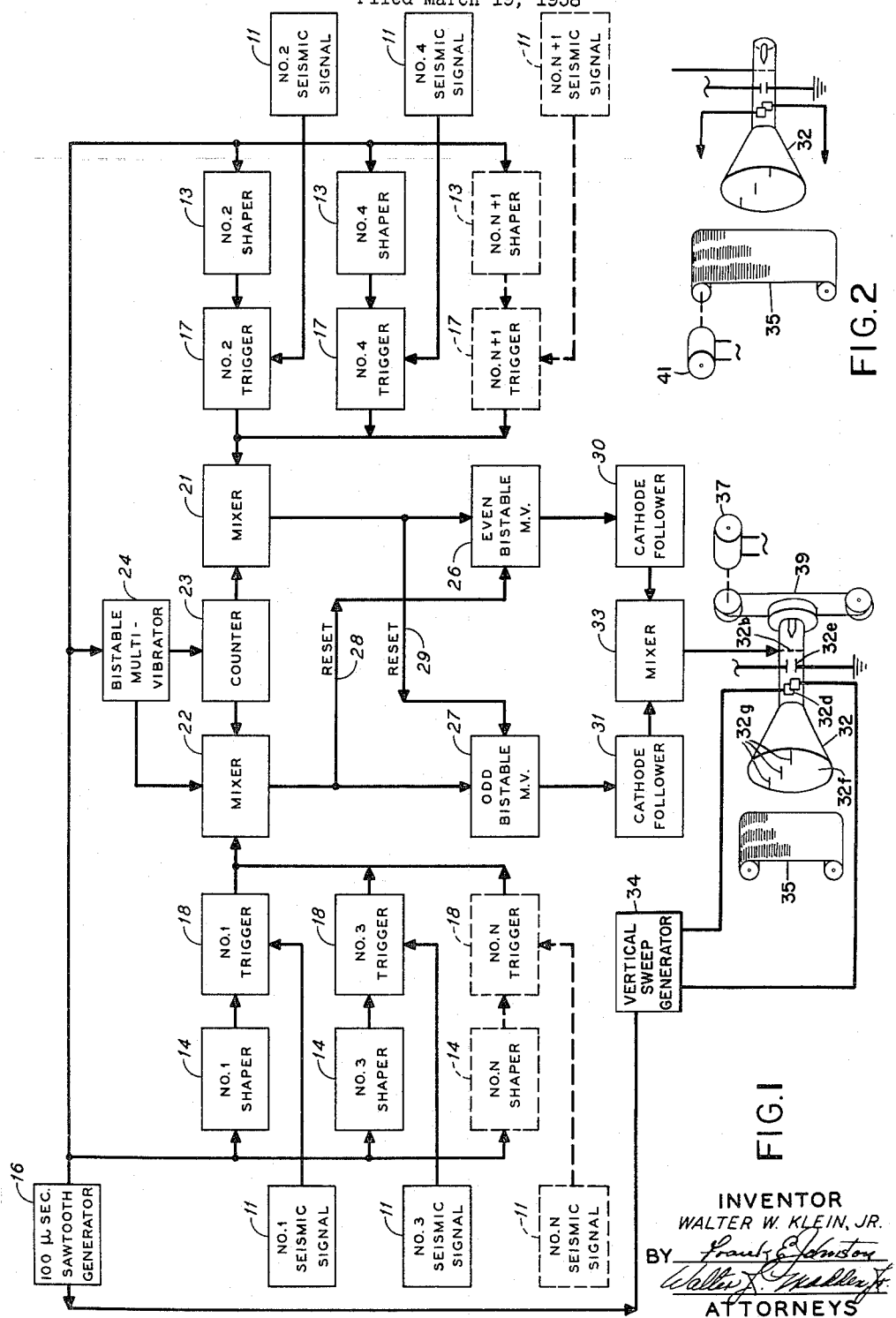

3,025,123
VARIABLE DENSITY DISPLAY FOR SEISMIC DATA
Walter W. Klein, Jr., Fullerton, Calif., assignor to California Research Corporation, San Francisco, Calif., a corporation of Delaware
Filed Mar. 19, 1958, Ser. No. 722,571
5 Claims. (Cl. 346—34)

The present invention relates in general to seismic prospecting and relates more specifically to methods and apparatus for displaying or presenting the data obtained in such prospecting.

In seismic prospecting, a charge of explosives is detonated in the earth and energy from the explosion is detected by one or more seismic detectors spaced some distance from the explosion point. The outputs of the seismic detectors are then recorded, usually as side-by-side traces on some recording medium, such as an oscillographic camera or a magnetic recording device. In the conventional seismic record, the traces are presented with amplitudes varying as a function of time, and an effort is made to line up or "pick" peaks common to two or more traces, indicative of the receipt by the different detectors of energy from a common reflecting horizon.

In addition to presenting the seismic detector signals individually or presenting the detector signals from a given explosion, there is considerable interest in the presentation of large quantities of seismic data. The various forms of such presentation include the seismic record section which is manually or mechanically produced and which presents a large number of seismic detector signals plotted on a time or depth basis. In such a mass presentation the geophysicist is looking for subtle trends in the data such as gross features that extend over many records. Such features may be the gradual "legging out" of the events, the gradual disappearance of signals in the noise level and the gradual changes in the total number of events on a record. Such features may be associated with, say, the approaching of a "singing" area, the pinching out of a bed, or the gradual transition from a shaly to a sandy section.

One method of such mass presentation of large quantities of data is the enlargement of the size of the presentation. This enlarged presentation is viewed from a distance to avoid seeing the small detail or individual traces in preference to the over-all trends of the entire display. However, such a large presentation is not particularly satisfactory, owing to its size and the difficulties of analysis. Thus, to retain the advantages of a large size of presentation without necessitating such a large physical size, it is desirable to increase the density of seismic information per unit area of the display so that a large amount of seismic data can be presented on a reasonably sized display.

One of the most suitable forms of such display having an increased information density is the so-called variable density or variable intensity presentation, in which variations in the amplitude of the seismic signal are represented by variations in intensity or density on the display surface. One method available heretofore for producing this type of presentation has been the use of a photographic film having a wide tonal range on which the seismic detector signals were impressed as variations in the intensity of a light to produce shadings on the film corresponding to the amplitude of the signals. This system produced an effective display which ranges from black, corresponding to a maximum amplitude in one direction, to white, corresponding to the maximum in the opposite direction, with varying shades of gray in between. However, the method is subject to the disadvantage that it requires high quality photographic paper to produce the desired tonal range, and further requires considerably more elaborate developing procedures than does the photographic paper conventionally used in seismic cameras.

Broadly, the present invention relates to methods and apparatus for presenting seismic data in the form of a density or intensity presentation without requiring any special photographic paper or special photographic developing techniques. In the present invention the seismic detector signal is utilized to modulate a characteristic of a group of pulses in accordance with variations in the amplitude of the detector signal. This modulated characteristic of the group of pulses is converted into a corresponding series of light pulses which are photographed as a function of time to produce a photographic record in which variations in the composition of the pulse group correspond to variations in the amplitude of the seismic detector signal.

In accordance with this invention, the amplitude of the seismic detector signal is utilized to control the selection of a series or group of pulses from a fixed number of pulses occurring within a predetermined time interval. The number of such pulses selected during this predetermined time interval will vary in dependence upon the amplitude of the seismic detector signal during the time interval in which the pulses occur.

The pulses within this pulse group are converted into corresponding light pulses and photographically recorded as a function of time to produce a record of the seismic detector signal or signals which gives the appearance of being a variable density or variable intensity display. The variable density effect is produced by the spacings of the lines corresponding to the light pulses on the photographic paper. Where the entire group of pulses occur within the predetermined time interval, the closely spaced lines give a dark appearance on the paper, and where none of the pulses occur within a predetermined time interval, the photographic record has a white appearance. Intermediate shades of gray result from closely spaced dark and light lines on the photographic paper, corresponding to intermediate numbers of pulses within the time interval. However, since the paper is never partly exposed to produce an intermediate density, a wide latitude in photographic processing results.

In accordance with this invention each seismic information channel is sampled during a predetermined time interval, such as a millisecond, to produce a group of pulses during each such sampling. The number of pulses actually produced during the time interval or sampling period will depend on the instantaneous amplitude of the seismic signal during the interval. By way of example, however, I have found that in a very satisfactory system, the number of pulses during each sampling interval may vary from zero to ten, with zero pulses corresponding to a maximum negative value of the seismic signal, five pulses for zero value of the seismic signal and ten pulses for a maximum positive excursion of the seismic information. Alternatively, the above polarities could of course be reversed if desired and, also the number of pulses corresponding to the different values of the seismic signal could be varied.

Within the predetermined time interval the pulses for the different seismic signals or channels are preferably produced sequentially, so that a pulse from channel 2 immediately follows a pulse from channel 1, and so on until the entire seismic record has been sampled. Then the sampling procedure may start again with channel 1 to again sequentially sample the entire seismic record. Of course, the rate at which the seismic signals are sampled is high compared to the frequency of the seismic signals themselves so that representative samplings may be obtained. This sampling procedure is continuous until, at the end of the predetermined interval of time, the ten possible pulses in each group in each of the seismic channels are produced. It is to be understood that all ten pulses in each group are not necessarily produced for each sampling interval, since pulses are omitted from the sequence in accordance with variations in the instantaneous amplitude of the sampled signal.

The pulses produced in accordance with the above procedure may be converted into corresponding light pulses by any suitable means. I have found that a cathode ray tube is particularly adapted for use in the present invention, since it is capable of handling the high frequencies involved in the sampling procedure. Preferably, the pulses are utilized to blank and unblank the beam of the cathode ray tube, and the beam is suitably deflected across the face of the tube in synchronism with the pulse production. Where the recording medium is stationary, the beam of the cathode ray tube may be deflected by a suitable time base deflection signal in addition to a deflection signal to provide spacing between the pulses corresponding to the different seismic channels. Alternatively, the cathode ray beam may be deflected only in the dimension required to produce spacing between the different seismic channels and the recording medium may be moved past the cathode ray beam to provide a suitable time base. As a further alternative, the cathode ray tube may be moved past the stationary recording medium, while the beam is deflected to produce spacings between channels.

The resulting record is thus in the form of a series of spaced tracks or channels, each of such tracks corresponding to a given seismic signal and comprising groups of pulses of variable composition or number, the composition or number of pulses within a given group being determined by the instantaneous amplitude of the sampled seismic signal during that sampling interval. The over-all appearance of the record is that of a variable density presentation, with the variable groupings of the pulses producing effects of black, white and gray, as indicated above.

Objects and advantages of the present invention will be readily apparent from the following description when read in connection with the accompanying drawings:

FIG. 1 illustrates, in block diagram form, apparatus for producing a display in accordance with the present invention.

FIG. 2 illustrates an alternative arrangement for producing relative movement between a stationary cathode ray tube and recording medium.

As shown in FIG. 1, the seismic detector signals to be visually displayed are represented by sources 11. If the sismic detector signals are to be displayed directly in the field, sources 11 would then represent the seismic detectors and associated filters and amplifiers. However, it is more likely to be the case that the display will be produced from a reproducible recording of the seismic detector signals which may be reproduced repeatedly and at will. In such a case, sources 11 would then represent the different playback or reproducing heads associated with the reproducible recording medium and through which the different seismic detector signals may be reproduced.

The number of such channels or sources 11 will vary in dependence upon the number of detectors utilized in recording the seismic detector signals, and the present invention is operative for any reasonable number of such detectors. As shown in the drawing, the "odd" numbered seismic channels are preferably disposed symmetrically with respect to each other, and similarly, the "even" numbered channels are symmetrically disposed and connected. To simplify the drawing, only channels 1, 3 and $n$ of the "odd" channels are shown, it being assumed that $n$ is an odd number. Similarly, on the "even" side, only channels 2, 4 and $n+1$ are shown. Thus, for example, in a representative 24 channel seismic record, channel $n$ will correspond to channel 23 and channel $n+1$ will correspond to the last or 24th channel.

The display apparatus includes a plurality of "even" shaper networks 13 and "odd" shaper networks 14. Each of the shaper networks 13 and 14 receives an input signal in the form of a sawtooth wave from a master sawtooth wave generator 16. Each of the shapers 13 and 14 is differently biased by means of adjustable bias networks, and the biases are so adjusted that the shapers are sequentially rendered conductive during one sweep of a sawtooth wave form from generator 16 to produce an output pulse. Each of the shapers 13 has associated therewith a trigger generator 17, and each of shapers 14 has associated therewith a trigger generator 18. Each of trigger generators 17 and 18 receives one input from its associated shaper and another input which is a measure of the amplitude of the seismic detector signal from the associated source 11. Each time that a shaper is rendered conducting, it causes its associated trigger to produce a pulse. The amplitude of this pulse is controlled by and dependent upon the instantaneous amplitude of the seismic detector signal from the associated device 11.

Assuming the seismic detector signal from channel 1 is to be displayed first, then the signal from channel 2, and so on, the channel 1 shaper will fire first, then channel 2 shaper, then channel 3 shaper, and so on during one cycle of the sawtooth wave from generator 16. Thus, each of the shaper networks produces an output pulse once during each cycle of the sawtooth wave from generator 16, causing each trigger to produce a pulse whose amplitude is a function of the instantaneous amplitude of each seismic signal.

The outputs of all the "even" trigger generators 17 are combined and supplied to a mixing network 21. Similarly, the output pulses from the "odd" trigger generators 18 are combined and supplied to an "odd" mixing network 22. Mixing networks 21 and 22 each also receive an input in the form of a staircase wave from a counter 23 which is in turn controlled by a bistable multivibrator 24. Multivibrator 24 is controlled from sawtooth wave generator 16. The period of the staircase wave from counter 23 corresponds to the interval within which all of the pulses in a group are to be produced. Within this period, the staircase wave has a number of steps corresponding to the maximum possible number of pulses within a group, with each of the steps having a duration corresponding to the time required for producing one sampling of each seismic channel. The relation of the amplitude of the pulses from the trigger generators to the amplitude of the staircase wave is such that if the seismic signal is maximum, the mix of the pulses and staircase wave always exceed a predetermined value; if the seismic signal is maximum in the reverse polarity, the mix never exceeds the predetermined value, and if the seismic signal is zero, one-half of the pulses out of the mix exceed the predetermined value.

The output from "even" mixing network 21 is supplied to an "even" bistable multivibrator 26. Similarly, the output from "odd" mixing network 22 is supplied to an "odd" bistable multivibrator 27. Multivibrators 26 and 27 are so designed and adjusted that if the instantaneous values of the input pulses from mixers 21 and 22, respectively, are great enough, they will trigger the associated multivibrator. Thus, within the group interval, the multivibrators are triggered on each pulse if all the seismic signals are maximum, are never triggered if the seismic signals are maximum in the reverse polarity, and are sometimes triggered if the seismic signals are at some intermediate level. The "even" bistable multivibrator 26 is reset by a pulse through a conductor 28 from "odd" mixing network 22 and similarly, the "odd" bistable multivibrator 27 is reset by a pulse through a conductor 29 from the "even" mixing network 22.

The output pulses from multivibrators 26 and 27, when produced, are supplied through associated cathode follower amplifiers 30 and 31 to a mixing network 33. The output of mixing network 33 is supplied to the grid 32b of a cathode ray tube 32 to control the blanking and unblanking of the beam thereof. As is well known in the art, the beam of tube 32 may be biased sufficiently so that in the absence of a positive pulse on grid 32b, the beam is cut off, and is unblanked by the appearance on grid 32b of a positive pulse. Cathode ray tube 32 is also provided with a pair of deflection plates 32d to which a deflection voltage is supplied from a sweep generator 34. Sweep generator 34 in turn is keyed to sawtooth wave generator 16. Horizontal deflection, as seen in FIG. 1, is controlled by plates 32e.

The operation of the embodiment illustrated in FIG. 1 may be more clearly apparent from the following description of its operation in connection with a portion of a representative seismic detector signal. In the description to follow, it will be assumed that the seismic record to be displayed contains 24 traces or channels, that the seismic detector signals are to be sequentially sampled starting with channel 1 and proceeding through channel 24, and that the period of the sawtooth wave from generator 16 is 100 microseconds. At the beginning of one period of the 100 microsecond sawtooth wave from generator 16, the bias on shaper 14 of channel 1 is equal to the amplitude of the 100 microsecond sawtooth wave from generator 16 so that the channel 1 shaper produces an output pulse at this instant.

This output pulse is supplied to the channel 1 trigger generator 18 where it is combined with the measure of the instantaneous amplitude of the seismic detector signal from device 11 to cause the trigger generator to produce an output pulse having an amplitude proportional to the instantaneous amplitude of the seismic detector signal. This output pulse from the trigger generator is supplied to mixing network 22. Mixing network 22 also receives an input in the form of a staircase wave from counter 23.

Assuming that there are 24 seismic channels to be displayed and that the period of the sawtooth wave from generator 16 within which all 24 channels are to be sampled at least once is 100 microseconds, and further assuming that the maximum number of pulses within a group is to be 10, then a suitable period for the staircase wave from counter 23 will be 1 millisecond. That is, the staircase wave will decrease in amplitude in ten steps of 100 microseconds each. Thus, during each 100 microsecond step of the staircase wave, each of the 24 channels may be sampled once and the pulses produced from the trigger generators compared in mixing network 22 or 21 with the amplitude of the staircase wave at each step.

Assuming that at the instant of sampling the amplitude of the signal from channel 1 the seismic detector signal has zero amplitude, one-half of the pulses resulting from the mixing of the staircase wave form and the signal from the trigger generator will exceed the predetermined value corresponding to the bias on multivibrators 26 and 27. Thus, the first five pulses out of mixer 22 from the sampling of channel 1 do not exceed the bias on multivibrator 27, so that the multivibrator does not fire for these first five pulses. However, the last five pulses from the mixing network 22 have amplitudes exceeding the bias on multivibrator 27, causing multivibrator 27 to produce five pulses in the last five hundred microseconds of the one millisecond period. Each of these five pulses is 100 microseconds apart and is supplied through cathode follower amplifier 31 to mixer 33 for controlling the blanking and unblanking of the electron beam of cathode ray tube 32.

It will be understood that the above description related only to the sampling of the seismic detector signal from channel 1 and that in actual practice, each of the 24 channels of seismic information will be sequentially sampled and that such sequential sampling of each channel will occur ten times during the one millisecond interval to produce possibly ten output pulses. The operation of the sampling for the other channels will be similar to that described above for channel 1, with the different shapers sequentially rendered conductive once each sweep of the 100 microsecond sawtooth wave from generator 16 and with the seismic detector signal combined in the associated trigger generator to produce an output pulse from each of the trigger generators which is related to the instantaneous amplitude of the sampled seismic detector signal.

All of the "odd" pulses are combined in mixer 22 and compared with the staircase wave from counter 23 in a manner similar to that described above for channel 1, and the pulses resulting from this comparison are supplied to multivibrator 27 and then through cathode follower amplifier 31 to mixer 33. Similarly, all of the pulses from the "even" trigger generators 17 are compared in mixer 21 with the staircase wave from counter 23 and the pulses resulting from the comparison are supplied to multivibrator 26. The output pulses from multivibrator 26 are supplied through cathode follower amplifier 30 to mixer 33.

The "odd" bistable multivibrator 27 is reset by a reset pulse through conductor 29 from mixer 21. Similarly, "even" bistable multivibrator 26 is reset by a reset pulse through conductor 28 from mixer 22. These reset pulses are actually the trailing edges of the output pulses of mixers 21 and 22, so that after a given output pulse from odd mixer 22, the trailing edge of this pulse is supplied through conductor 28 to reset even multivibrator 26. Multivibrator 26 is then responsive to the next pulse from "even" mixer 21, which pulse will follow in time the pulse from "odd" mixer 22. The trailing edge of this pulse from mixer 21 will, in turn, reset or energize multivibrator 27 so that multivibrator 27 will be responsive to a next "odd" pulse from mixer 22. By means of this resetting arrangement, only two multivibrators are required for the entire group of seismic channels, thus eliminating the need for a multivibrator for each channel of seismic information.

Mixer 33 thus sequentially receives pulses corresponding to the pulses produced in the sampling of the seismic signals. For the sampling of the assumed signal from channel 1, mixer 33 would, during the one millisecond sampling interval, receive no pulses during the first 500 microseconds and would then receive five pulses 100 microseconds apart. All of these pulses are supplied to grid 32b of cathode ray tube 32 to unblank the beam at each pulse. The beam of cathode ray tube 32 is deflected vertically of the tube face in synchronism with the blanking and unblanking by vertical sweep generator 34 which is controlled by sawtooth wave generator 16.

In the present description, it is assumed that cathode ray tube 32 is moved relative to the recording medium 35 to provide a time deflection for the displayed signals, so that the beam need be deflected only vertically to provide spacing between the different channels. As shown in FIG. 1, tube 32 is moved up and down by carriage 39 and motor 37 in synchronism with the projection of lines 32g on face 32f of tube 32.

FIG. 2 illustrates an alternative arrangement wherein recording medium 35 is driven by motor 41 while cathode ray tube 32 remains stationary.

Assuming that the seismic detector signals are to be sequentially displayed from top to bottom on the recording medium, vertical deflection means 34 will position the beam at the top of the cathode ray tube at a time corresponding to the occurrence of pulses from channel 1. Vertical sweep generator 34 will then sweep the beam from top to bottom of the cathode ray tube, with pulses of the beam occurring during the sweep in accordance with pulses produced in the sequential sampling of the seismic channels. The vertical sweep generator 34 will thus sweep the beam across the tube face in a period of 100 microseconds, corresponding to the period within which each of the 24 seismic channels is sampled once. At the end of the 100-microsecond period, an "end of information" pulse which is supplied from multivibrator 24 through mixer 22 and multivibrator 27 is impressed on grid 32b to blank out the electron beam during the retrace of the beam from the bottom back to the top of the tube face. The beam is thus positioned again at the top of the tube face and is swept across the tube face again in the next 100 microsecond interval, with the beam blanked and unblanked during the sweep in response to occurrence of the pulses from the 24 channels.

Simultaneously with this vertical deflection of the beam, tube 32 is moved relative to the recording medium to produce a time displacement of the seismic signals. If the seismic detector signals are to be plotted directly as a function of time, the movement of the tube relative to the recording medium will of course be linear with time. Alternatively, if the seismic signals are to be plotted as some function of depth, as is common in some seismic display systems, the movement of motor 37 which drives tube 32 relative to the recording medium will be programmed in accordance with the velocity function obtaining in the surveyed area.

The resulting record produced on the recording medium thus comprises a plurality of separate tracks or channels, with the pulse grouping in each track corresponding to variations in the amplitude of a particular seismic detector signal, to produce a resultant record in which the variations in the composition of the pulse groups give the visual effect of a variable density display.

I claim:

1. Apparatus for displaying seismic data in the form of a number of side-by-side simultaneously occurring, seismic detector signals, each of said signals having amplitudes varying as functions of time comprising first sampling network means for sequentially sampling the amplitude of each of the even-numbered ones of said seismic detector signals at least once during a predetermined time interval, second sampling network means for sequentially sampling the amplitude of each of the odd-numbered ones of said seismic detector signals at least once during said predetermined time interval, means for producing for each of said signals identical groups of electrical pulses during said predetermined time interval, means for selecting an integral number of said pulses occurring in each of said groups during said predetermined time interval in accordance with variations in the instantaneous amplitude of the associated seismic detector signal, a first multivibrator responsive to pulses from said first sampling network for producing a series of pulses corresponding to the selected pulses for said odd-numbered seismic detector signals, a second multivibrator connected to be conductive alternately with said first multi-vibrator and responsive to said pulses from said second sampling network for producing a series of pulses corresponding to the selected pulses representing said even-numbered seismic detector signals, a light source, means connecting said first and said second multivibrators to said light source to alternately pulse said light source in response to said selected pulses from said first and said second multi-vibrators, and a recording medium for recording said light pulses for each of said signals as a function of time to produce a record in which variations in the number of pulses recording in each of said groups correspond to variations in the amplitude of said seismic detector signals.

2. Apparatus for displaying seismic data in the form of a number of side-by-side simultaneously occurring, seismic detector signals, each of said signals having amplitudes varying as functions of time comprising first sampling network means for sequentially sampling the amplitude of each of the even-numbered ones of said seismic detector signals at least once during a predetermined time interval, second sampling network means for sequentially sampling the amplitude of each of the odd-numbered ones of said seismic detector signals at least once during said predetermined time interval, means for producing for each of said signals identical groups of electrical pulses during said predetermined time interval, means for selecting an integral number of said pulses occurring in each of said groups during said predetermined time interval in accordance with variations in the instantaneous amplitude of the associated seismic detector signal, a first multi-vibrator responsive to pulses from said first sampling network for producing a series of pulses corresponding to the selected pulses for said odd-numbered seismic detector signals, a second multivibrator connected to be conductive alternately with said first multi-vibrator and responsive to said pulses from said second sampling network for producing a series of pulses corresponding to the selected pulses representing said even-numbered seismic detector signals, a light source, means connecting said first and said second multivibrators to said light source to alternately pulse said light source in response to said selected pulses from said first and said second multi-vibrators, a recording medium, means for deflecting said light pulses in one dimension across said recording medium to produce a plurality of tracks corresponding to said signals, and means for providing relative movement between said light pulses and said recording medium in a dimension substantially perpendicular to said one dimension as a function of time to produce a record in which variations in the number of pulses recorded in each of said groups correspond to variations in the amplitude of said seismic detector signals.

3. Apparatus for displaying seismic data in the form of a number of side-by-side simultaneously occuring, seismic detector signals, each of said signals having amplitudes varying as functions of time comprising first sampling network means for sequentially sampling the amplitude of each of the even-numbered ones of said seismic detector signals at least once during a predetermined time interval, second sampling network means for sequentially sampling the amplitude of each of the odd-numbered ones of said seismic detector signals at least once during said predetermined time interval, means for producing for each of said signals identical groups of electrical pulses during said predetermined time interval, means for selecting an integral number of said pulses occurring in each of said groups during said predetermined time interval in accordance with the instantaneous amplitude of the associated seismic detector signal, a first multi-vibrator responsive to pulses from said first sampling network for producing a series of pulses corresponding to the selected pulses for said odd-numbered seismic detector signals, a second multi-vibrator connected to be conductive alternately with said first multi-vibrator and responsive to said pulses from said second sampling network for producing a series of pulses corresponding to the selected pulses representing said even-numbered seismic detector signals, a cathode ray tube, means connecting said first and said second multi-vibrators to said cathode ray tube to alternately pulse the electron beam of said cathode ray tube in response to said selected pulses from said first and said second multi-vibrator, and a recording medium for recording said light pulses for each of said signals as a function of time to produce a record in which variations in the number of pulses recorded in each of said groups correspond to variations in the amplitude of said seismic detector signals.

4. Apparatus for visually displaying a seismic detector trace having signal amplitude variations along said trace as a function of time, said display converting said amplitude variations to a simulated variable density display longitudinally along a track of constant width representing said trace, comprising means for separating said trace into discrete time intervals, means for sensing the signal amplitude of said trace a predetermined plurality of times during each of said discrete time intervals, said means for separating including means for generating a staircase reference voltage, said staircase reference voltage being varied between fixed predetermined limits in a plurality of steps during each of said discrete time intervals, each step of said reference voltage differing by a predetermined voltage with respect to the preceding step of said staircase reference voltage and the number of steps in said staircase reference voltage being the same as said predetermined plurality of times for sensing said signal amplitude within said discrete time interval, means for comparing said sensed signal amplitude to each step of said staircase reference voltage, said comparing means including electrical pulse generating means, said pulse generating means being operated when said sensed signal amplitude exceeds the voltage of the compared step of said staircase reference voltage, and recording means actuated by pulses from said pulse generating means to record a visible mark across the full width of said track during each comparison of said sensed signal amplitude and a step of said reference voltage, whereby said signal amplitude variations are displayed as simulated variable density by recording a varying number of visible marks within each discrete period in accordance with signal amplitude variation in that period.

5. Apparatus for visually displaying a plurality of seismic detector traces in side-by-side form, each trace having signals varying in amplitude along said trace as a function of time, said display converting said amplitude variations to a simulated variable density display longitudinally along a plurality of side-by-side tracks of constant width individually representing one of said traces, comprising means for separating each of said traces into discrete time intervals, means for sequentially sensing the amplitude of signals in each of said traces a predetermined plurality of times during each of said discrete time intervals, said means for separating including means for generating a staircase reference voltage, said staircase reference voltage being varied between fixed predetermined limits in a plurality of steps during each of said discrete time intervals, each step of said reference voltage differing by a predetermined voltage with respect to the preceding step of said staircase reference voltage and the number of steps in said staircase reference voltage being the same as said predetermined plurality of times for sensing said amplitude of signals in each of said traces within said discrete time interval, means for comparing each of said sequentially sensed signal amplitudes to each step of said staircase reference voltage, said comparing means including electrical pulse generating means, said pulse generating means being operated when said sequentially sensed signal amplitudes exceed the voltage of the compared step of said staircase reference voltage, recording means actuated by pulses from said pulse generating means to record a visible mark across the full width of one of said side-by-side tracks during each comparison of said sensed signal amplitude and a step of said reference voltage, and means for synchronizing said recording means with said means for sequentially sensing to position said visible marks for individual seismic detector traces in the same individual track during sequential comparisons of said sensed signals with each step of said reference voltage.

References Cited in the file of this patent
UNITED STATES PATENTS

| | | |
|---|---|---|
| 2,678,254 | Schenck | May 11, 1954 |
| 2,858,475 | Blake | Oct. 28, 1958 |
| 2,877,080 | Eisler et al. | Mar. 10, 1959 |

UNITED STATES PATENT OFFICE
CERTIFICATE OF CORRECTION

Patent No. 3,025,123                  March 13, 1962

Walter W. Klein, Jr.

It is hereby certified that error appears in the above numbered patent requiring correction and that the said Letters Patent should read as corrected below.

Column 7, line 66, for "recording" read -- recorded --.

Signed and sealed this 30th day of October 1962.

(SEAL)
Attest:

ERNEST W. SWIDER
Attesting Officer

DAVID L. LADD
Commissioner of Patents